United States Patent [19]

Jaske

[11] 4,281,588

[45] Aug. 4, 1981

[54] RECIPROCATING PISTON FLUID POWERED MOTOR

[75] Inventor: Robert F. Jaske, Michigan City, Ind.

[73] Assignee: Sprague Devices, Inc., Michigan City, Ind.

[21] Appl. No.: 49,083

[22] Filed: Jun. 18, 1979

[51] Int. Cl.³ .................... F01L 25/04; F01B 9/00; F16J 11/02
[52] U.S. Cl. .................................... 91/290; 91/219; 91/329; 92/136; 92/169
[58] Field of Search ............... 91/290, 329, 234, 416, 91/219, 328; 92/169, 136

[56] References Cited

U.S. PATENT DOCUMENTS

| 987,940 | 3/1911 | Anderson | 91/290 |
|---|---|---|---|
| 1,062,904 | 5/1913 | Fournia | 91/290 |
| 3,144,813 | 8/1964 | Bostiaanse | 91/329 |
| 3,229,589 | 1/1966 | Langas | 91/416 |
| 3,376,791 | 4/1968 | Ashfield et al. | 91/290 |

FOREIGN PATENT DOCUMENTS

| 816142 | 7/1959 | United Kingdom | 91/290 |
| 816143 | 7/1959 | United Kingdom | 91/290 |

Primary Examiner—Paul E. Maslousky
Attorney, Agent, or Firm—Oltsch, Knoblock & Hall

[57] ABSTRACT

A reciprocating piston fluid powered motor providing great flexibility in its mounting and the location of the motor shaft and fluid inlet lines. Relatively few component parts are employed and a number of the components are used as-cast or with minimal machining operations required.

8 Claims, 6 Drawing Figures

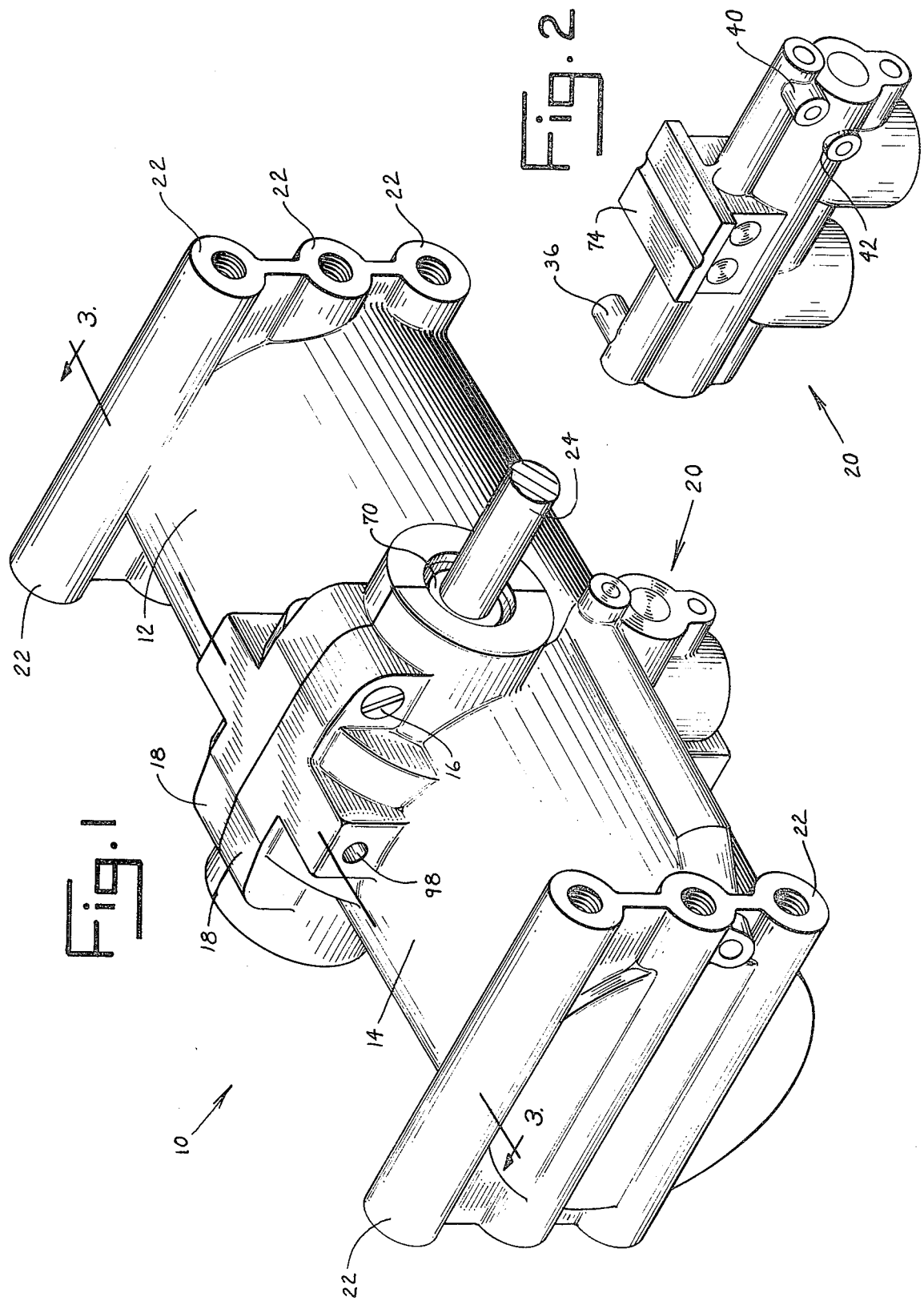

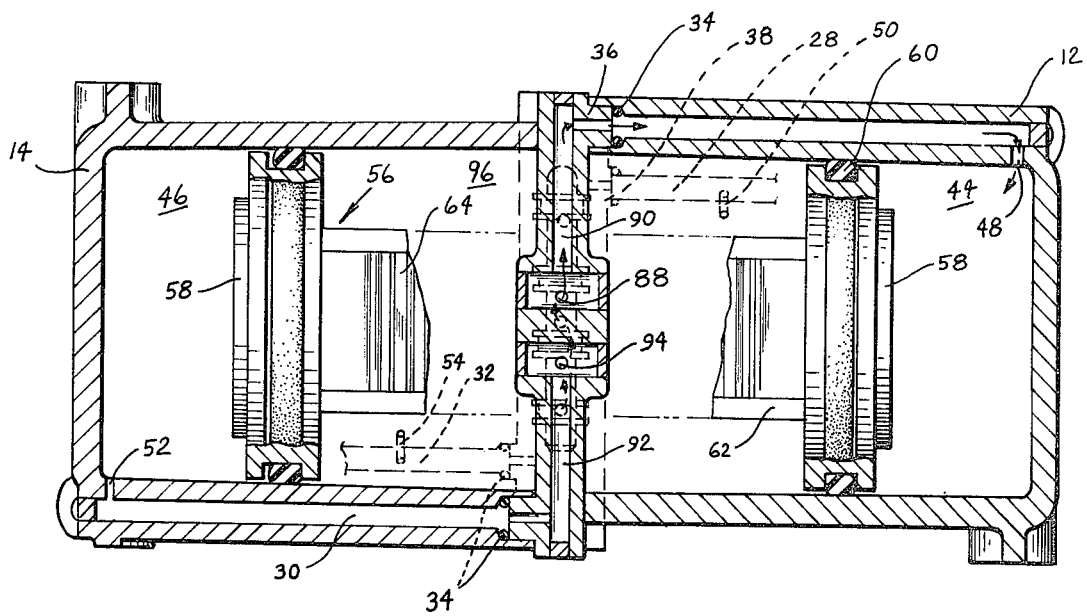
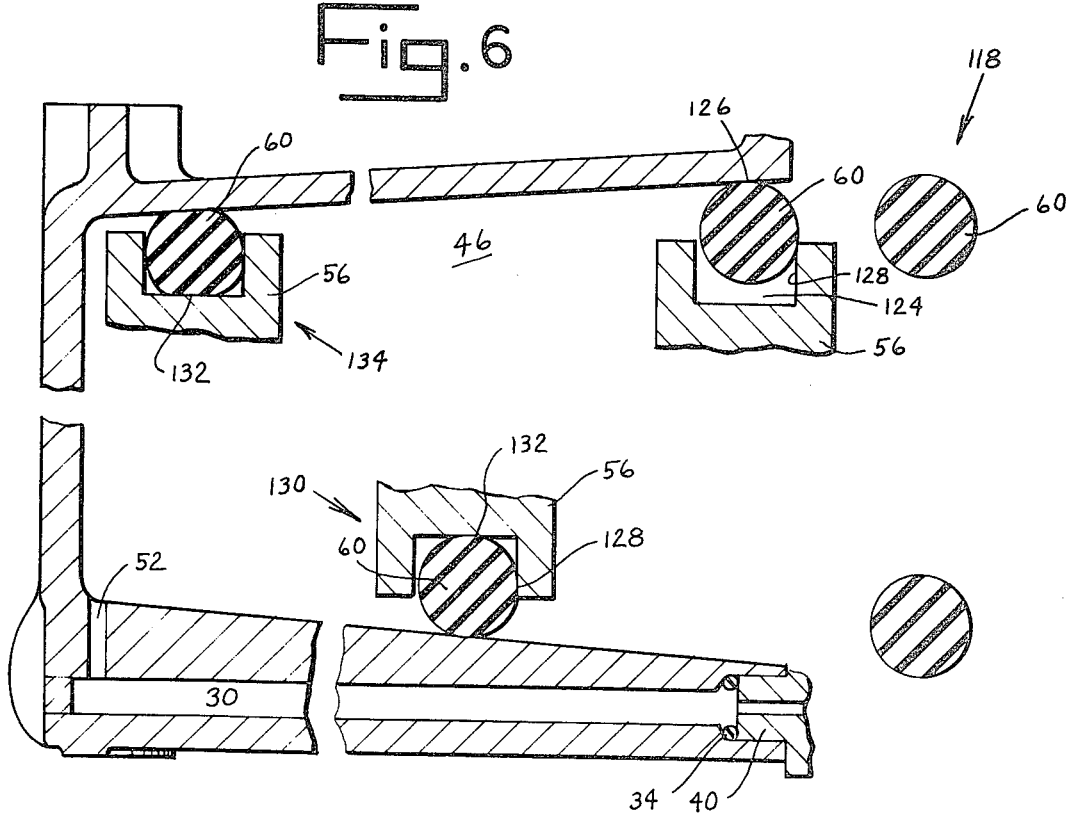

RECIPROCATING PISTON FLUID POWERED MOTOR

SUMMARY OF THE INVENTION

This invention relates to a reciprocating piston fluid powered motor.

In the motor of this invention, a dual piston unit reciprocates within a motor housing. The dual piston heads are spaced apart and are connected by a gear tooth rack. The rack teeth mesh with a pinion gear drivingly attached to a motor shaft which is journaled for rotation in the housing.

The housing of the motor is comprised of two halves, being identical castings with each having an open end and a closed end and having a piston bore tapering slightly between a smaller diameter closed end a larger diameter open end. The castings are secured together at their open ends. The castings have complementary recesses at their abutting ends which receive a valve apparatus housing. A four-land spool valve is shiftably received in the valve housing. Fluid flow passages, valve ports, and fluid ports of the valve housing, in association with the spool valve, direct fluid supplied to the motor, first to the piston bore of one casting, and then to the piston bore of the other casting through complementary passages in the motor housing halves. Fluid is exhausted from the piston bores through the same passages, under valve control, and into the interior of the motor between the piston heads. Exhaust vents in the motor housing allow the fluid to escape from the motor interior. Valve ports in the piston bore of each housing half control the application of fluid pressure to passages connected to the valve apparatus. Fluid pressure in these valve ports and passages, when the piston heads pass the valve ports, cause the spool valve to be shifted to reverse the fluid flow within the motor and cause the piston unit to reciprocate within the motor housing.

The valve apparatus also has a "park" piston in association with the spool valve. A park fluid inlet port communicates with the face of the park piston opposite the spool valve. Fluid pressure applied to the park fluid inlet port causes the park piston to advance against the spool valve and prevent shifting of the spool valve in the valve housing. The reciprocation of the dual piston unit is thereby stopped at one end of its travel, causing the motor shaft to be stopped at one extreme of its rotation.

The tapered piston bores of this motor are preferably formed by producing castings from polished cores, and hence can be used without subsequent preparation of the bore surface. The bores are tapered to the minimum extent required for removal of the core from the casting. A resilient sealing ring of circular cross section, commonly known as an O-ring, seats in a circumferential groove in each piston head. The resilient ring has an outer diameter greater than the largest diameter of the housing bore in which the ring and piston reciprocate. When a piston is located at the large diameter end of the bore, the ring provides a seal by contacting the bore surface and one radial wall of the groove in which it is positioned. As a piston moves toward the smaller diameter end of the bore, the ring is progressively reduced in its outer diameter and a point is reached at which the inner diameter of the ring contacts the bottom of the piston groove. When this point is reached, the ring provides a seal by contacting the bore surface, a radial groove wall, and the bottom of the groove. As the piston progresses toward the small diameter end of the bore, the ring is squeezed between the bore surface and the bottom of the groove and is thus distorted from its normal or true circular cross-sectional shape. The ring cross-section is chosen to insure that the ring will not be forced through the gap between the piston outer diameter and the bore surface when the ring is at the large end of the bore.

By way of illustration, this motor can be advantageously utilized to operate the windshield wipers on trucks, buses, construction machinery, locomotives, and other vehicles. It is not limited to vehicles, but may extend to other applications where rotary oscillatory motion of a shaft is desired. For example, driving commercial washing machine agitators or directing traffic on roller conveyors.

Accordingly, it is an object of this invention to provide a fluid powered oscillatory motor employing a piston unit which reciprocates in a housing and which is sealed in a tapered bore by a resilient ring of circular cross section.

Another object is to provide an oscillatory fluid powered motor having a housing comprised of two identical complementary castings.

Another object is to provide a fluid powered oscillatory motor having a novel two-part housing in which is formed a power cylinder or bore, a valve-receiving recess, and a plurality of fluid passages.

Another object is to provide a fluid powered oscillatory motor having a valve apparatus receivable transversely in the motor housing in either of two alternate orientations.

Another object is to provide a fluid powered oscillatory motor having a valve apparatus employing a novel park piston therein to cause the motor shaft to be stopped at one extreme of its rotation.

Another object of this invention is to provide a fluid powered oscillatory motor which is compact and provides a high degree of flexibility in its mounting and application.

Another object of this invention is to provide a fluid powered oscillatory motor which is efficient and economical in use and which can be inexpensively manufactured.

Other objects of this invention will be apparent from the following specification.

BRIEF DESCRIPTION OF THE DRAWINGS

FIG. 1 is a perspective view of the motor of this invention.

FIG. 2 is a perspective view of the valve assembly housing of the motor.

FIG. 5 is a longitudinal sectional view taken along line 5—5 of FIG. 3.

FIG. 6 is a diagramatic representation of the sealing action accomplished by the resilient ring in the tapered bore of this motor.

DESCRIPTION OF THE PREFERRED EMBODIMENT

Figure 3:
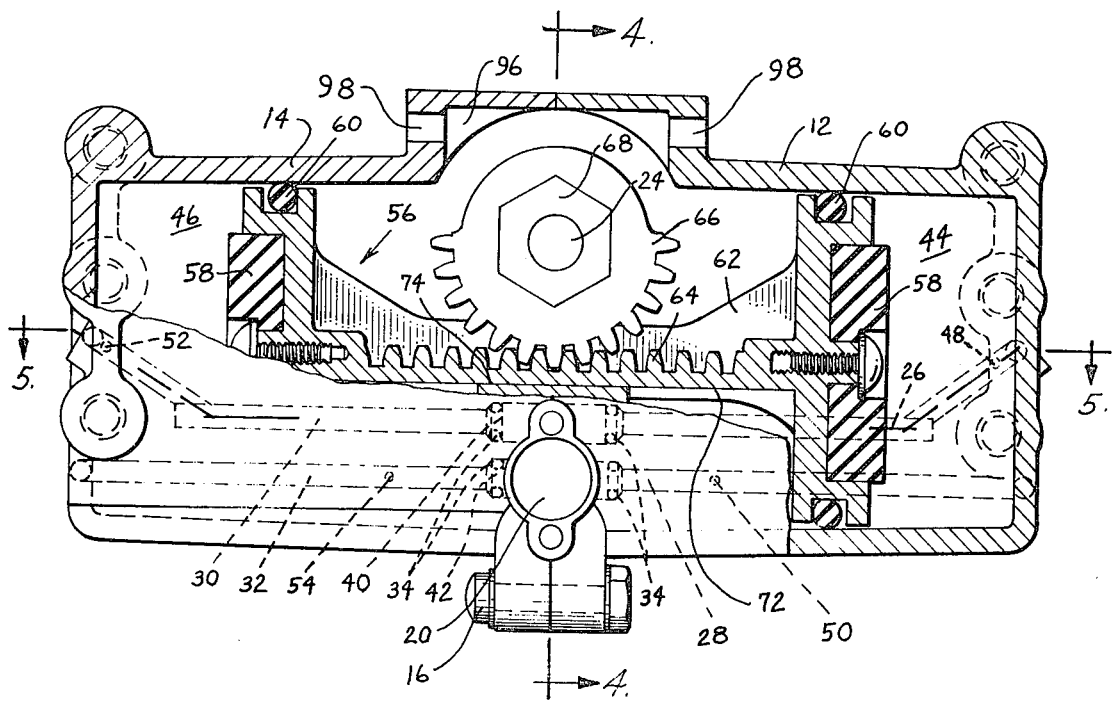
FIG. 3 is an elevational view with parts shown in section taken along line 3—3 of FIG. 1.

The preferred embodiment illustrated is not intended to be exhaustive nor to limit the invention to the precise form disclosed. It is chosen and described to explain the principles, application, and practical use of the invention and to thereby better enable others skilled in the art to utilize the invention. Such preferred embodiment is illustrated in FIGS. 1-6.

Referring to the drawings, the numeral 10 designates a housing comprised of two identical cup-shaped housing parts 12 and 14 secured together at their open ends, as by screws 16 extending through end flanges 18. A valve housing 20, as seen in FIG. 2, is secured to the motor housing between the flanges 18. Motor housing 10 has formed in it a number of attachment holes in mounting portions or projections 22. A motor shaft 24 is suitably journaled in the housing between the flanges 18, as by bearings 70.

As seen in FIGS. 3 and 5, the housing halves 12 and 14 have formed within them internal passages 26, 28, 30, and 32. Seals are provided at 34 between bosses 36, 38, 40, and 42 of valve housing 20 and the housing halves of motor housing 10. The passage 26 communicates with the outer end of a piston bore 44 at a port 48, and passage 28 communicates with an intermediate part of bore 44 at a port 50. Passage 30 communicates with the outer end of a piston bore 46 at a port 52, and passage 32 communicates with an intermediate part of bore 46 at a port 54.

A dual piston unit 56 is contained within motor housing 10 and has a cushion 58 at each end. An annular groove is formed in each piston head and receives a sealing ring 60. The intermediate portion 62 of piston unit 56 has formed upon it a section of gear teeth 64 defining a rack. Rack 64 meshes with a pinion gear 66 which is drivingly attached to motor shaft 24 by a hexagonal section 68 thereon. The intermediate portion 62 of piston unit 56 has a planar bottom surface 72. Valve housing 20 has a top bearing surface 74. Bearing surface 74 slidingly supports piston unit surface 72 to insure proper engagement of rack 64 with pinion gear 66 and to thereby guide movement of the piston unit 56 within the bores 44 and 46.

Figure 4:
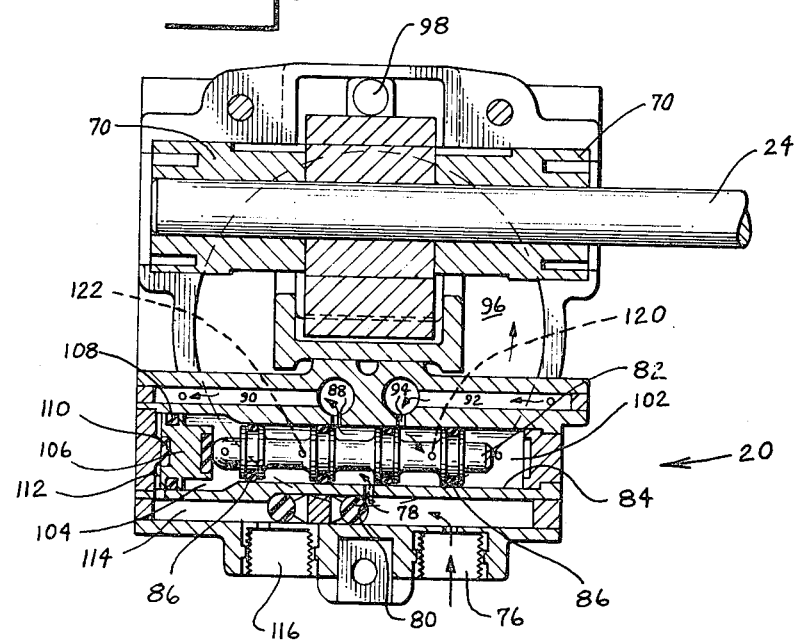
FIG. 4 is a transverse sectional view taken along line 4—4 of FIG. 3.

Referring to FIGS. 4 and 5, the valve housing 20 has a fluid inlet port 76 communicating through an internal passage 78 with a port 80. The valve housing has a bore 84 in which a spool valve 82 is reciprocable. Spool valve 82 has four spaced annular enlargements, each having a circumferential groove receiving a seal ring 86. Fluid admitted into valve bore 84 through 80, in the valve position shown in FIG. 4, flows to and through port 88. Port 88 communicates with a passage 90 and to a port within a boss 36 which communicates with passage 26. Fluid flows through passage 26 in housing half 12 to port 48 and into the cylinder bore 44. The fluid pressure in bore 44 causes piston unit 56 to move toward the left, as viewed in FIGS. 3 and 5.

Fluid contained in bore 46, seen on the left in FIG. 5, is exhausted through the port 52, passage 30, passage 92 (as viewed in FIG. 4), through port 94 into bore 84, and hence through a port 120 which communicates with the cavity 96 of housing 10 between the two heads of piston 56. Fluid discharged into cavity 96 is exhausted from the motor housing 10 through the ports 98.

In the operation of the motor, as piston unit 56 moves to the left, as viewed in FIG. 3, a point is reached where seal 60 of the trailing piston passes across port 50 in housing half 12. When port 50 is exposed, the fluid pressure from cylinder bore 44 will flow through port 50, passage 28, a port in boss 38, to the chamber 104 as viewed in FIG. 4 at the left end of spool valve 82. This fluid pressure will cause spool valve 82 to be shifted toward the right. The movement of spool valve 82 changes the above described fluid flow and causes piston unit 56 to reverse its direction and begin to move toward the right, as viewed in FIG. 3. The motor housing half 14 has a port 54 and a passage 32 which are similar to the port 50 and the passage 28 of motor housing half 12. The port in boss 42 of valve housing 20 communicates with the chamber 102 at the right end of spool valve 82, as viewed in FIG. 4. A port 122 is similar to the port 120 in valve bore 84. The port 94 and passage 92 are similar to the port 88 and passage 90.

As long as fluid pressure is supplied to the port 76, dual piston unit 56 will be caused to reciprocate within motor housing 10 and motor shaft 24 will be oscillated through a selected partial rotation.

As viewed in FIG. 4, valve bore 84 has at its left end at 104 a section of increased diameter. Received within this increased diameter portion of valve bore 84 is a park piston 106 which has a circumferential groove receiving a sealing ring 108. A reduced abutment 110 on the park piston 106 limits movement of the park piston to the left in bore part 104. To provide a chamber 112 open at all times. The chamber 112 to the left of park piston 106 communicates with passage 114 to a park fluid inlet port 116. When fluid is supplied to port 116 at a pressure equal to or greater than the fluid supplied at port 76, park piston 106 is caused to move to the right, as viewed in FIG. 4, and to shift spool valve 82 to the right in bore 84. In this way, the reciprocation of piston 56 is stopped at one extreme of its motion and the motor shaft 24 is stopped at one extreme of its rotation.

Valve housing 20 may be assembled with motor housing 10 with the park piston on the left, as viewed in FIG. 4, or on the right. The symmetry of the housing 20 about its longitudinal axis, i.e., transverse to the motor housing 10, is seen in FIG. 2. Therefore, the valve housing may be selectively mounted on the motor housing so that the park piston 106 may be caused to park the motor piston 56 at the left end or at the right end of its stroke, as viewed in FIG. 3. In this way, motor shaft 24 may be caused to be parked in its fully clockwise or fully counterclockwise rotative position. Additionally, motor shaft 24, pinion 66, hexagonal part 68, and bearings 70 may be mounted in motor housing 10 so that motor shaft 24 projects to the right as viewed in FIG. 4, or to the left. Therefore, this motor provides a user with great flexibility as to the placement of the fluid inlet port 76, the park fluid inlet port 116, the motor shaft 24, and the parked position of motor shaft 24.

The sealing of the piston 56 accomplished by the resilient rings 60 is diagrammatically illustrated in FIG. 6. The taper of bore 46 is shown exaggerated to better illustrate the cooperation of seal ring 60 with piston 56 and bore 46 to accomplish a seal. Piston 56 and seal 60 are shown in three positions within bore 46 which are occupied by the piston and seal as they move within bore 46 from right to left in FIG. 6. While the sectional views of the piston and seal are partial views, it will be understood that the piston and seal together span the bore 46 and that seal 60 makes continuous circumferential contact with the bore surface 46. As seen at 118, the seal ring 60 has a larger outer diameter than the largest diameter of the bore 46. When the seal ring 60 is placed in the circumferential groove 124 of piston 56, and the piston unit is assembled in the motor housing, each ring is inserted into a bore 46 and the seal ring 60 engages the bore surface at 126 and the wall 128 of groove 124, adjacent the large diameter end of bore 46. In operation, as fluid pressure urges piston 56 toward the left as seen in FIG. 6 fluid pressure acting to move the piston within the bore 46 is sealed by contact of the seal 60 with the bore surface at 126 and with the radial wall of seal groove 124 at 128. As the piston 56 moves toward the left, as viewed in FIG. 6, the outer diameter of seal ring 60 is progressively reduced as the diameter of bore 46 decreases. As illustrated at 130, a point is reached at which the inner diameter of seal ring 60 contacts the bottom 132 of seal groove 124. At this point, three lines of sealing are provided, the first at the contact of seal ring 60 with the surface 46 of the bore, the second at the contact of seal ring 60 with radial wall 128 of seal groove 124, and the third at the contact of seal ring 60 with the bottom surface 132 of seal groove 124. Further movement of piston 56 in the bore 46 toward the small diameter end of the bore results in continued reduction in the outer diameter of seal ring 60. The inner diameter of seal ring 60 is now limited by the diameter of groove bottom 132, and therefore, cannot be further reduced. Seal ring 60 is thus compressed between the groove surface 132 and bore 46 from its normally circular cross section. The radial walls of piston groove 124 are spaced sufficiently to accommodate this distortion of the seal. Piston 56 continues in its motion toward the left, as viewed in FIG. 6, to expel the fluid from the left end of bore 46, as viewed in FIG. 5. When piston 56 reaches the leftward end of its motion it stops and begins to move toward the right under the influence of fluid pressure now being admitted to the bore 46 from port 52. As seen at 134, in FIG. 6, the seal ring 60 is under maximum radial compression at the point where piston unit 56 stops. In this way, maximum sealing integrity is provided at the point where fluid pressure will be momentarily the highest, i.e., at the point of reversal of the motion of piston unit 56. As viewed in FIG. 6, at 126, the seal 60 is of sufficient sectional diameter to insure that it will not be forced between the bore surfaces at 126 and the radial wall of piston 56 at 128. The construction requires circumferential clearance of the enlarged ends of piston unit 56 in bores 46 when positioned at the smallest end of the respective tapered housing bores 44 and 46.

The housing halves 12 and 14 of this motor can be cast on polished molds and the bore surfaces can therefore be used in their condition as cast. The motor housing halves 12 and 14 are identical castings and require no surface finishing operations to their piston bores in order to function reliably as piston cylinders. The tapered bore is necessary in order to allow the core to be removed from the solidified casting.

It is to be understood that the invention herein disclosed is not to be limited to the precise form described, but may be modified within the scope of the appended claims.

We claim:

1. An oscillatory fluid powered motor comprising a motor housing formed of two similar cup-shaped parts secured together at their open ends to define an elongated bore therein, said housing parts having complementary passages therein and a fluid outlet, a piston unit having spaced piston heads slidable in said bore and an intermediate reduced dimension section connecting said piston heads, a motor shaft journaled for rotation in said housing between said housing parts, drive transmission means connecting said motor shaft and said piston unit for rotationally driving said motor shaft in response to linear motion of said piston unit, a valve unit having a housing secured to and transverse of said motor housing between said motor housing parts and having an elongated bore transverse of said motor housing bore communicating with a fluid inlet and a valve spool slidable in said valve bore, and valve housing having passages therein controlled by said valve spool and so arranged and communicating with said motor housing passages and with said fluid inlet and said fluid outlet that said piston unit and spool valve are caused to reciprocate in response to fluid pressure supplied at said inlet.

2. The motor as defined in claim 1, wherein said drive transmission means connecting said motor shaft and said piston unit includes gear teeth on said reduced dimension section between said piston heads defining a gear rack, a pinion gear drivingly attached to said motor shaft, said gear rack drivingly meshing with said pinion gear whereby linear movement of said dual piston unit within said motor housing causes rotation of said motor shaft.

3. The motor defined in claim 1, wherein a recess is formed in the motor housing adjacent the open end of each motor housing half and said valve housing seats in said recess.

4. The motor defined in claim 3, wherein said valve unit housing includes a bearing surface positioned within said motor housing, the reduced dimension section of said piston having a planar surface opposite said gear rack, said planar surface slidingly engaging said bearing surface whereby said gear rack is supported in engagement with said pinion gear and said piston unit is guided in its motion within said bore.

5. The motor defined in claim 1, wherein said valve unit includes a park piston slidable in said valve bore adjacent to a park fluid inlet port at one end of said valve bore and communicating with a second fluid inlet, said park piston advancing against said spool valve to stop reciprocation of said valve when fluid is supplied at said second inlet.

6. The motor defined in claim 1, wherein said valve unit housing and passages therein are symmetrical about the longitudinal axis thereof, whereby said valve housing may be assembled with said motor housing in either of two opposite orientations.

7. An oscillatory fluid powered motor comprising a motor housing formed of two similar cup shaped parts secured together at their open ends to define an elongated bore therein tapering slightly from the center to the ends thereof, said housing parts having complementary passages therein and a fluid outlet, a piston unit having spaced interconnected pistons substantially concentric in and having slight clearance in said bore and each having a circumferential groove, a motor shaft journaled for rotation in said housing, drive transmission means connecting said motor shaft and said piston unit, a resilient sealing ring received in each piston groove and having a normal outer diameter at least equal to the diameter of the large diameter portion of said housing bore and a thickness greater than a radial space between the bottom of a groove and the adjacent part of the housing bore at the small diameter portion of said housing bore and greater than the clearance between the piston and the housing bore at the larger diameter portion of the bore, and a valve unit having a valve housing secured to said motor housing between said motor housing parts and a fluid pressure actuated valve element therein, said valve housing having a fluid inlet, said valve element controlling fluid flow from said inlet and through said passages to said outlet to reciprocate said piston unit in said motor housing.

8. A motor as defined in claim 7, wherein fluid is discharged by said valve element into said motor housing between said spaced pistons and thence to said fluid outlet.

* * * * *